United States Patent [19]
Nakamura

[11] Patent Number: 5,375,336
[45] Date of Patent: Dec. 27, 1994

[54] GYRO-COMPASS

[75] Inventor: Takeshi Nakamura, Nagaokakyo, Japan

[73] Assignee: Murata Manufacturing Co., Ltd., Nagaokakyo, Japan

[21] Appl. No.: 53,659

[22] Filed: Apr. 29, 1993

[30] Foreign Application Priority Data

May 8, 1992 [JP] Japan .................... 4-143333

[51] Int. Cl.⁵ ............................. G01C 19/56
[52] U.S. Cl. ..................... 33/324; 33/318; 364/443
[58] Field of Search ............ 33/324, 351, 318, 320, 33/322, 333, 354; 73/504; 364/443, 449, 453

[56] References Cited

U.S. PATENT DOCUMENTS

| | | | |
|---|---|---|---|
| 5,046,011 | 9/1991 | Kakihara et al. | 364/443 X |
| 5,247,466 | 9/1993 | Shimada et al. | 364/453 X |
| 5,272,922 | 12/1993 | Watson | 33/318 X |

FOREIGN PATENT DOCUMENTS

0533163  3/1993  European Pat. Off. ............ 73/504
402298812 12/1990  Japan ............................. 73/504

Primary Examiner—Christopher W. Fulton
Attorney, Agent, or Firm—Nikaido, Marmelstein, Murray & Oram

[57] ABSTRACT

A support base of an angular velocity sensor is supported rotatably at one end, and the support base is vibrated by a piezoelectric element. By this vibration, a known rotational angular velocity is applied to the angular velocity sensor. For example, a difference of two output signals of the angular velocity sensor is measured. This difference of the output signals is detected in synchronism with phases which differ from each other by 180°, in two synchronous detection circuits. The detected signal is smoothed in smoothing circuits, and further, amplified in amplifying circuits. An output signal of the amplifying circuit is composed in a variable resistor as a composite circuit. Meanwhile, from the output signal of the amplifying circuit, the output signal of the variable resistor and a signal corresponding to the known rotational angular velocity are subtracted.

8 Claims, 6 Drawing Sheets

OUTPUT OF FIRST
DIFFERENTIAL CIRCUIT 44

FIG. 3(B)

OUTPUT OF FIRST
SYNCHRONOUS DETECTION
CIRCUIT 46

FIG. 3(C)

OUTPUT OF SECOND
SYNCHRONOUS DETECTION
CIRCUIT 48

FIG. 3(D)

OUTPUT OF FIRST
AMPLIFYING CIRCUIT 52

FIG. 3(E)

OUTPUT OF SECOND
AMPLIFYING CIRCUIT 56

FIG. 3(F)

OUTPUT OF VARIABLE
RESISTOR 58

FIG. 3(G)

OUTPUT OF THIRD
DIFFERENTIAL CIRCUIT 64

FIG. 4 (A)

OUTPUT OF FIRST
DIFFERENTIAL CIRCUIT 44

FIG. 4 (B)

OUTPUT OF FIRST
SYNCHRONOUS DETECTION
CIRCUIT 46

FIG. 4 (C)

OUTPUT OF SECOND
SYNCHRONOUS DETECTION
CIRCUIT 48

FIG. 4 (D)

OUTPUT OF FIRST
AMPLIFYING CIRCUIT 52

FIG. 4 (E)

OUTPUT OF SECOND
AMPLIFYING CIRCUIT 56

FIG. 4 (F)

OUTPUT OF VARIABLE
RESISTOR 58

FIG. 4 (G)

OUTPUT OF THIRD
DIFFERENTIAL CIRCUIT 64

F I G. 5 (A)

OUTPUT OF FIRST
DIFFERENTIAL CIRCUIT 44

F I G. 5 (B)

OUTPUT OF FIRST
SYNCHRONOUS DETECTION
CIRCUIT 46

F I G. 5 (C)

OUTPUT OF SECOND
SYNCHRONOUS DETECTION
CIRCUIT 48

F I G. 5 (D)

OUTPUT OF FIRST
AMPLIFYING CIRCUIT 52

F I G. 5 (E)

OUTPUT OF SECOND
AMPLIFYING CIRCUIT 56

F I G. 5 (F)

OUTPUT OF VARIABLE
RESISTOR 58

F I G. 5 (G)

OUTPUT OF THIRD
DIFFERENTIAL CIRCUIT 64

FIG. 6(A)

OUTPUT OF FIRST
DIFFERENTIAL CIRCUIT 44

FIG. 6(B)

OUTPUT OF FIRST
SYNCHRONOUS DETECTION
CIRCUIT 46

FIG. 6(C)

OUTPUT OF SECOND
SYNCHRONOUS DETECTION
CIRCUIT 48

FIG. 6(D)

OUTPUT OF FIRST
AMPLIFYING CIRCUIT 52

FIG. 6(E)

OUTPUT OF SECOND
AMPLIFYING CIRCUIT 56

FIG. 6(F)

OUTPUT OF VARIABLE
RESISTOR 58

FIG. 6(G)

OUTPUT OF THIRD
DIFFERENTIAL CIRCUIT 64

GYRO-COMPASS

BACKGROUND OF THE INVENTION

1. Field of the Invention

The present invention relates to a gyro-compass, particularly, it relates to a gyro-compass for detecting a position of a moving body such as an automobile and the like.

2. Description of the Prior Art

Conventionally, in order to measure a position of, for example, an automobile, an angular velocity sensor or the like has been used. In this case, the position of the automobile was detected from a moving direction of the automobile detected by the angular velocity sensor and the like, and a moving distance obtained from a speed meter of the automobile.

However, since the velocity of the automobile is calculated from a number of revolutions of tires, errors are produced in the moving distance being measured due to the amount of air in the tires and unevenness of a road. Therefore, it is difficult to detect the position of the automobile accurately. Also, connections with the sensor for obtaining the number of revolutions of the tires is necessary.

SUMMARY OF THE INVENTION

It is, therefore, a primary object of the present invention to provide a gyro-compass capable of measuring both a rotational angular velocity and a linear velocity or acceleration accurately, for measuring a moving direction and moving distance of a moving body such as an automobile and the like accurately.

The present invention is directed to a gyro-compass comprising an angular velocity sensor, angular velocity applying means for applying a known rotational angular velocity to the angular velocity sensor, a plurality of synchronous detection circuits for detecting an output signal of the angular velocity sensor in synchronism with different phases, a plurality of smoothing circuits for smoothing output signals of the plurality of synchronous detection circuits, a composite circuit for composing output signals of the plurality of smoothing circuits, a differential circuit for obtaining a difference between one output signal of the plurality of smoothing circuits and an output signal of the composite circuit, and a separate differential circuit for obtaining a difference between an output of the differential circuit and a signal corresponding to the known rotational angular velocity applied by the angular velocity applying means.

Since the known rotational angular velocity is applied to the angular velocity sensor, when the linear velocity or acceleration is applied to the angular velocity sensor, a signal corresponding to the linear velocity or acceleration is superposed on the output signal of the angular velocity sensor. Furthermore, when the rotational angular velocity is applied to the angular velocity sensor from the outside, its output signal becomes a composite signal of the signal corresponding to the known rotational angular velocity, the signal corresponding to the external rotational angular velocity and the signal corresponding to the linear velocity or acceleration.

When detecting the output signal of the angular velocity sensor in synchronism with the different phases, in respective phases, a composite signal of the signal corresponding to the rotational angular velocity and the signal corresponding to the linear velocity or acceleration is obtained. By smoothing and composing these signals, the signal corresponding to the external rotational angular velocity and the signal corresponding to the know rotational angular velocity are canceled. Thus, a signal obtained from the composite circuit becomes the signal corresponding to the linear velocity or acceleration. Meanwhile, by subtracting the signal corresponding to the known rotational angular velocity and the signal corresponding to the linear velocity or acceleration from one of the signals after synchronous detection, a signal corresponding to the rotational angular velocity applied to the angular velocity sensor from the outside is obtained.

According to the present invention, by applying the known rotational angular velocity to the angular velocity sensor, the signal corresponding to the linear velocity or acceleration is superposed on the output signal of the angular velocity sensor. Since only the signal corresponding to the linear velocity or acceleration can be taken out, the linear velocity or acceleration can be detected. Furthermore, by integrating the obtained velocity or acceleration, a moving distance can be known. Since the signal corresponding to the rotational angular velocity applied to the angular velocity sensor from the outside can be obtained, the rotational angular velocity can be known. As such, since both the external rotational angular velocity and the linear velocity or acceleration can be detected, when this gyro-compass is installed on an automobile and the like, the position of the automobile can be detected accurately.

The above and other objects, features, stages and advantages of the present invention will become more apparent from the following detailed description made with reference to the drawings.

DESCRIPTION OF THE PREFERRED EMBODIMENTS

Figure 1:
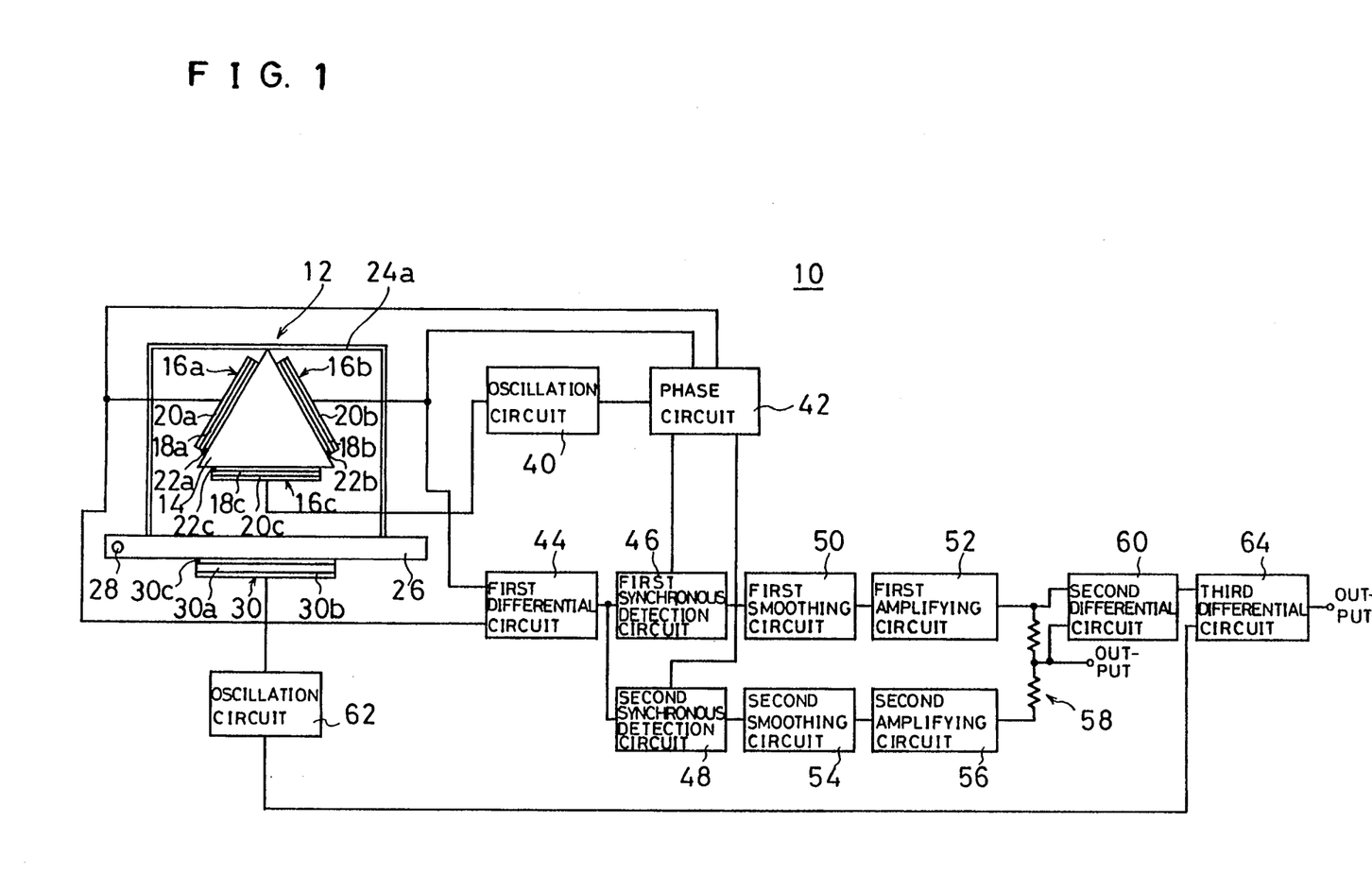
FIG. 1 is a block diagram showing one embodiment of the present invention.
Figure 2:
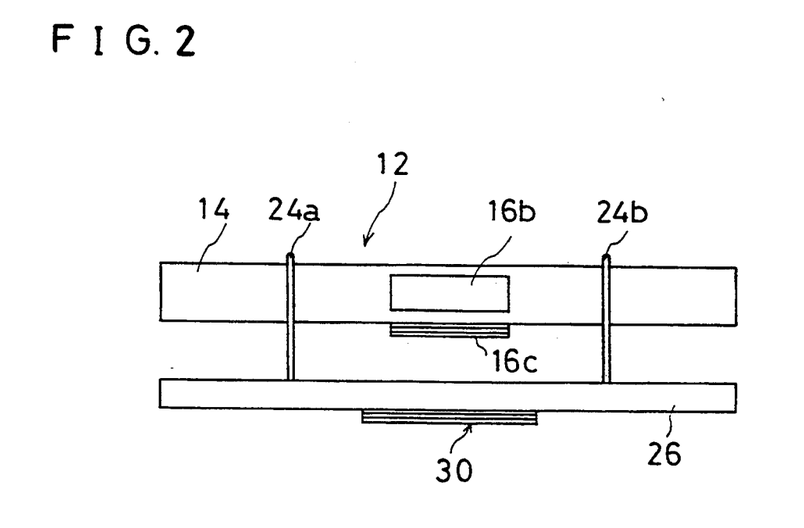
FIG. 2 is a side view showing a surroundings of an angular velocity sensor of a gyro-compass shown in FIG. 1.

FIG. 1 is a block diagram showing one embodiment of the present invention. A gyro-compass 10 includes an angular velocity sensor 12. As the angular velocity sensor 12, as shown in FIG. 1 and FIG. 2, for example, a vibration-type angular velocity sensor is used. The angular velocity sensor 12 includes a vibrator 14. The vibrator 14 is formed into a regular triangular columnar shape by, in general, a material generating mechanical vibration such as elinvar, iron-nickel alloy, quartz, glass, crystal, ceramics and the like.

At the center of three side faces of the vibrator 14, piezoelectric elements 16a, 16b and 16c are formed respectively. The piezoelectric element 16a includes a piezoelectric layer 18a, on both surfaces of which electrodes 20a and 22a are formed. One electrode 22a is bonded to the side face of the vibrator 14. Similarly, the piezoelectric elements 16b, 16c include piezoelectric layer 18b, 18c, on both surfaces of which electrodes 20b, 22b and electrodes 20c, 22c are formed. Electrodes 22b, 22c of the piezoelectric elements 16b, 16c are bonded to the side faces of the vibrator 14.

Meanwhile, the vicinity of nodal points of the vibrator 14 are supported by support members 24a and 24b consisting of, for example, a metal wire. The support members 24a and 24b are secured to the vicinity of the nodal points by, for example, welding. The support members 24a, 24b are secured to a support base 26. One end of the support base 26 is supported rotatably by a shaft 28. The shaft 28 is mounted so as to be parallel to an axial direction of the vibrator 14. Furthermore, on the lower face of the support base 26, a piezoelectric element 30 as angular velocity applying means is formed. The piezoelectric element 30 consists of a piezoelectric layer 30a and electrodes 30b, 30c formed on both surfaces of the piezoelectric layer 30a. By the piezoelectric element 30, the support base 26 vibrates reciprocally within an arc about the shaft 28, and thereby the known rotational angular velocity is applied to the angular velocity sensor 12.

In the gyro-compass 10, among the piezoelectric elements 16a-16c of the angular velocity sensor 12, any two thereof are used for detection and the remaining one is used for driving. In this embodiment, the piezoelectric elements 16a and 16b are used for detection and driving, and the piezoelectric element 16c is used for feedback.

Between the driving piezoelectric elements 16a, 16b and the feedback piezoelectric element 16c, an oscillation circuit 40 and a phase circuit 42 are connected as a feedback loop for self-oscillation driving of the angular velocity sensor 12. A driving signal is given by the oscillation circuit 40 and the phase circuit 42, and the angular velocity sensor 12 is bent and vibrated in a direction orthogonal to a face whereon the piezoelectric element 16c is formed.

Furthermore, the detecting piezoelectric elements 16a, 16b are connected to a first differential circuit 44. In the first differential circuit 44, a difference between the outputs of the piezoelectric elements 16a and 16b is detected. The output of the first differential circuit 44 is inputted to a first synchronous detection circuit 46 and a second synchronous detection circuit 48. To the first synchronous detection circuit 46 and the second synchronous detection circuit 48, a synchronous signal is given from the phase circuit 42. In the first synchronous detection circuit 46 and the second synchronous detection circuit 48, in synchronism with the phases which differ from each other by 180°, the output signal of the first differential circuit 44 is detected.

The first synchronous detection circuit 46 is connected to a first smoothing circuit 50, in turn the first smoothing circuit 50 is connected to a first amplifying circuit 52. In the first smoothing circuit 50, an output signal of the first synchronous detection circuit 46 is smoothed, and the smoothed signal is amplified in the first amplifying circuit 52. Similarly, the second synchronous detection circuit 48 is connected to a second smoothing circuit 54, in turn, the second smoothing circuit 54 is connected to a second amplifying circuit 56. In the second smoothing circuit 54, an output signal of the second synchronous detection circuit 48 is smoothed, and the smoothed signal is amplified in the second amplifying circuit 56.

Output signals of the first amplifying circuit 52 and the second amplifying circuit 56 are connected to a variable resistor 58 as a composite circuit. The variable resistor 58 is so adjusted that its output becomes zero when the linear velocity or acceleration is not applied to the gyro-compass 10. Furthermore, output signals of the variable resistor 58 and the first amplifying circuit 52 are inputted to a second differential circuit 60. In the second differential circuit 60, the output signal of the variable resistor 58 is subtracted from the output signal of the first amplifying circuit 52.

To the piezoelectric element 30 as the angular velocity applying means, an oscillation circuit 62 for driving the piezoelectric element 30 is connected. By a signal of the oscillation circuit 62, the support base 26 is vibrated within an arc about the shaft 28. Meanwhile, from the oscillation circuit 62, a signal corresponding to the rotational angular velocity applied to the angular velocity sensor 12 by driving the support base 26 is output. The signal corresponding to the known rotational angular velocity is obtained by amplifying, and further, smoothing the signal for driving the piezoelectric element 30. The signal corresponding to the known rotational angular velocity and the output signal of the second differential circuit 60 are input to a third differential circuit 64. In the third differential circuit 64, the signal corresponding to the known rotational angular velocity is subtracted from the output signal of the second differential circuit 60. The signal corresponding to the known rotational angular velocity is the same signal as the output signal obtained from the second differential circuit 60, when the rotational angular velocity and the linear velocity or acceleration are not applied from the outside.

The operation of the gyro-compass 10 is described. First, a case where the piezoelectric element 30 is not driven and the known rotational angular velocity is not applied to the angular velocity sensor 12 is considered. In this state, the vibrator 14 of the angular velocity sensor 12 is bent and vibrated in a direction orthogonal to a face whereon the piezoelectric element 16c is formed. When the rotational angular velocity is not applied from the outside and the linear velocity or acceleration is not applied, voltages generated in two piezoelectric elements 16a and 16b are in the same direction and same in strength. Thus, the output of the first differential circuit 44 becomes zero. Therefore, the outputs of the variable resistor 58 and the third differential circuit 64 are both zero, and it is clear that neither the rotational angular velocity nor the linear velocity or acceleration are applied.

Figure 3A:
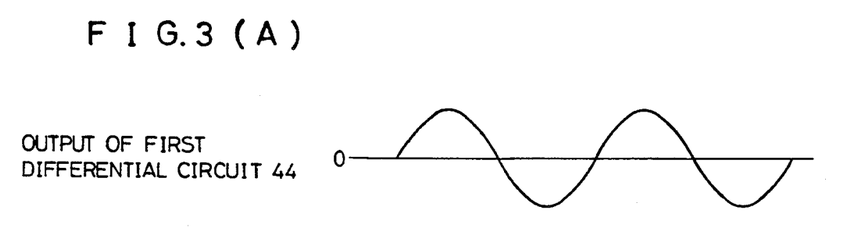
FIGS. 3(A)–3(G) are graphs showing output signals of respective circuits, when only a known rotational angular velocity is applied to an angular velocity sensor.
Figure 3B:
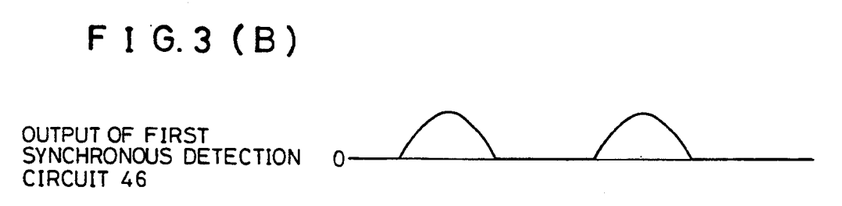
Figure 3C:
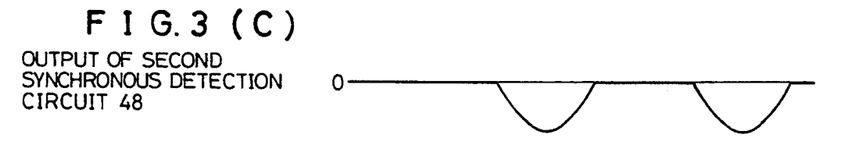
Figure 3D:
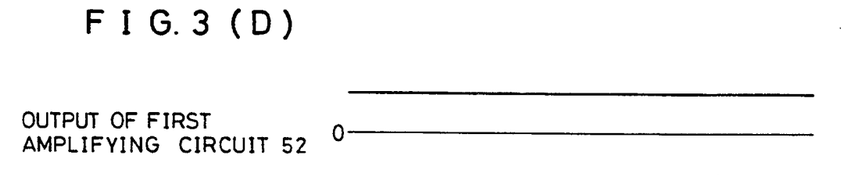
Figure 3E:
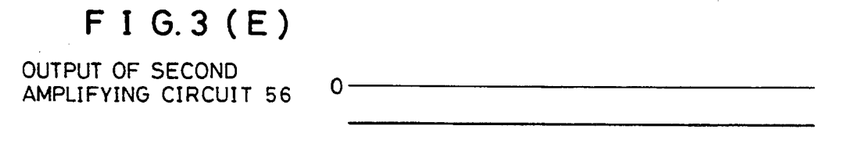
Figure 3F:
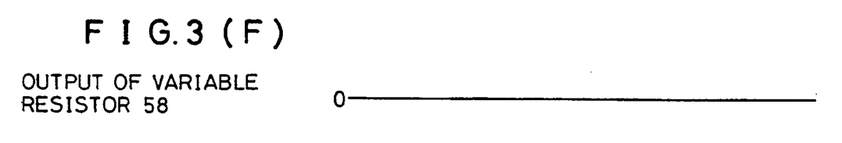

Next, a case where the support base 26 is moved and the known rotational angular velocity is applied to the angular velocity sensor 12 is considered. In this case, when the external rotational angular velocity and the linear velocity or acceleration are not applied, a difference in output voltages between the piezoelectric elements 16a and 16b is produced by the given rotational angular velocity. Thus, the output signal is generated in the first differential circuit 44. The rotational angular velocity applied to the angular velocity sensor 12 is applied at a fixed period and amplitude by the oscillation circuit 62. Therefore, the output of the first differential circuit 44 is output as, for example, a sine wave as shown in FIG. 3(A). In the first synchronous detection circuit 46, for example, a positive side signal is detected centering around 0 V. In the second synchronous detection circuit 48, a negative side signal is detected centering around 0 V. Thus, as shown in FIG. 3(B) and FIG. 3(C), the output signal of the first synchronous detection circuit 46 and the output signals of the second synchronous detection circuit 48 are in the opposite direction with each other, and have the same strength. Therefore, when these signals are smoothed and amplified, as shown in FIG. 3(D) and FIG. 3(E), D.C. outputs which are in the opposite direction with each other and having the same strength are obtained. When these signals are composed in the variable resistor 58, as shown in FIG. 3(F), its output becomes zero. Thereby, it is clear that the linear acceleration is not applied.

Figure 3G:
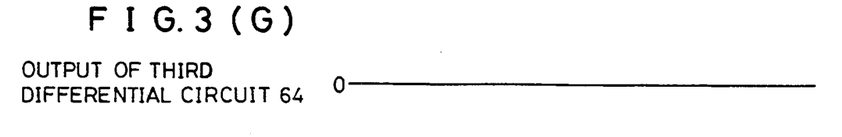

The output of the first amplifying circuit 52 is the output signal of the first differential circuit 44 whose positive side is detected and amplified. Since the output of the variable resistor 58 is zero, the output signal of the second differential circuit 60 becomes the same output signal as the first amplifying circuit 52. The output signal of the second differential circuit 60 is a signal corresponding to the known rotational angular velocity applied to the angular velocity sensor 12. Thus, as shown in FIG. 3(G), an output from the third differential circuit 64 becomes zero. Thereby, it is clear that the rotational angular velocity is not applied to the angular velocity sensor 12 from the outside.

Figure 4A:
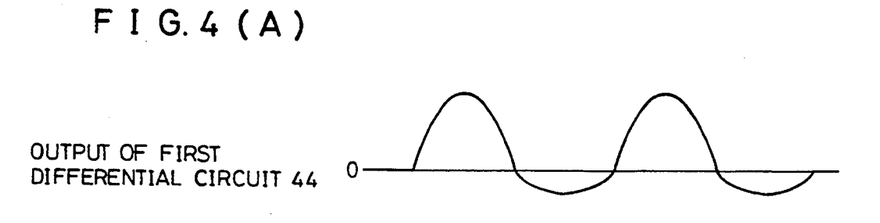
FIGS. 4(A)–4(G) are graphs showing output signals of respective circuits, when a known rotational angular velocity and a linear velocity or acceleration are applied to an angular velocity sensor.
Figure 4B:
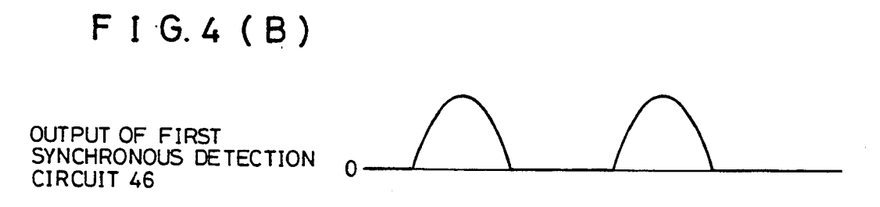
Figure 4C:
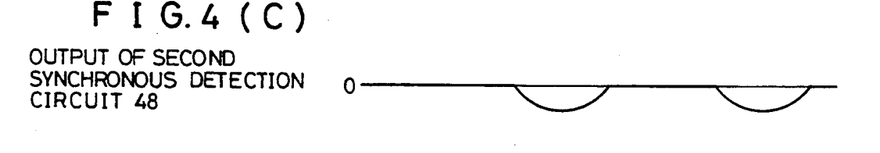
Figure 4D:
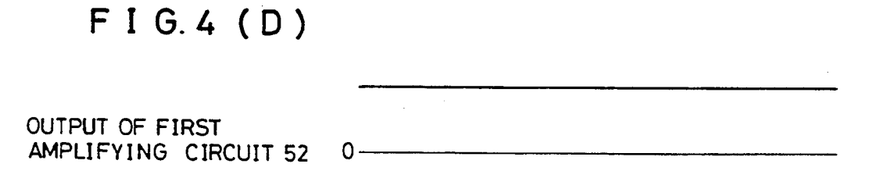
Figure 4E:
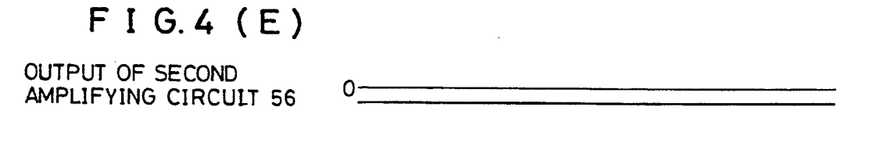
Figure 4F:
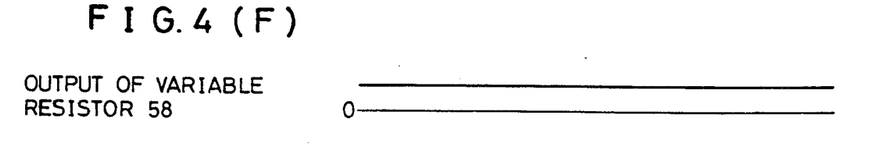

Next, a case where a velocity or an acceleration is applied in a linear direction orthogonal to an axis of the angular velocity sensor 12 is considered. In this case, since the known rotational angular velocity is applied to the angular velocity sensor 12 by the piezoelectric element 30, a force is exerted on the vibrator 14 in a direction in which the velocity or acceleration is applied. Therefore, on the voltages generated in the piezoelectric elements 16a and 16b, a fixed output voltage is superposed responsive to the velocity or acceleration. Thus, the output signal of the first differential circuit 44 becomes a waveform signal shifted upward from 0 V as shown in FIG. 4(A). Since the rotational angular velocity is not applied to the angular velocity sensor 12 from the outside, an amplitude of the output signal of the first differential circuit 44 is same as that shown in FIG. 3(A). This output signal is detected in synchronism with phases which differ from each other by 180°, in the first synchronous detection circuit 46 and the second synchronous detection circuit 48. That is, in the first synchronous detection circuit 46, the positive side of the output signal of the first differential circuit 44 is detected as shown in FIG. 4(B). In the second synchronous detection circuit 48, the negative side of the output signal of the first differential circuit 44 is detected as shown in FIG. 4(C). When these signals are smoothed in the first smoothing circuit 50 and the second smoothing circuit 54, and amplified in the first amplifying circuit 52 and the second amplifying circuit 56, a high voltage is output from the first amplifying circuit 52 as shown in FIG. 4(D), and a low voltage is output from the second amplifying circuit 56 as shown in FIG. 4(C). When these signals are composed in the variable resistor 58, an output corresponding to the linear velocity or acceleration is obtained from its output terminal as shown in FIG. 4(F).

Figure 4G:
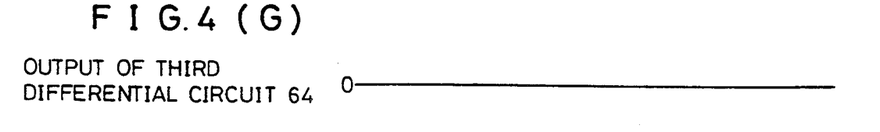

In the second differential circuit 60, the output signal of the variable resistor 58 is subtracted from the output signal of the first amplifying circuit 52. Therefore, from the second differential circuit 60, a signal obtained by subtracting the signal by the linear velocity or acceleration applied to the angular velocity sensor 12, from the output signal of the first amplifying circuit 52 is output. This signal is a signal corresponding to the known rotational angular velocity applied to the angular velocity sensor 12. Thus, when the signal corresponding to the known rotational angular velocity is subtracted in the third differential circuit 64, the output from the third differential circuit becomes zero as shown in FIG. 4(G). Thereby, it is clear that the rotational angular velocity is not applied to the angular velocity sensor 12 from the outside.

Figure 5A:
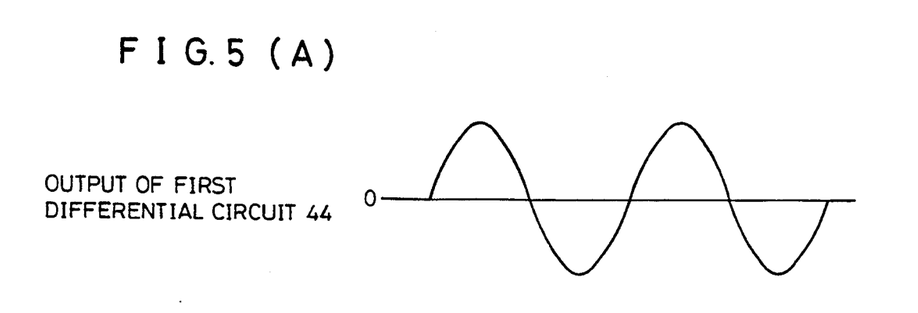
FIGS. 5(A)–5(G) are graphs showing output signals of respective circuits, when a known rotational angular velocity and an external rotational angular velocity are applied to an angular velocity sensor.
Figure 5B:
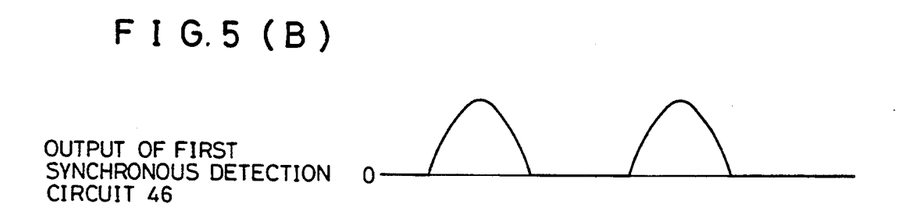
Figure 5C:
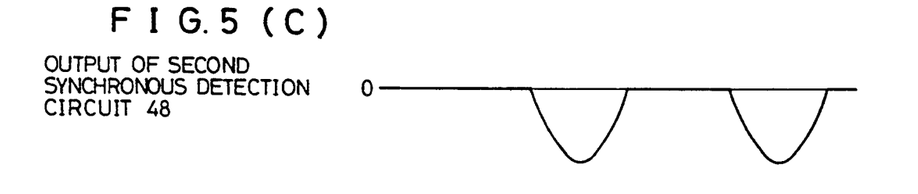
Figure 5D:
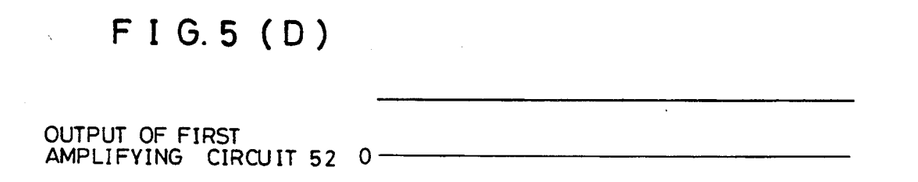
Figure 5E:
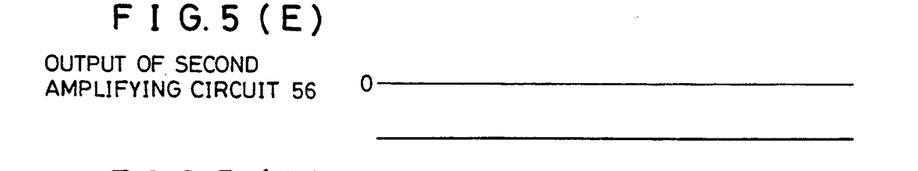
Figure 5F:
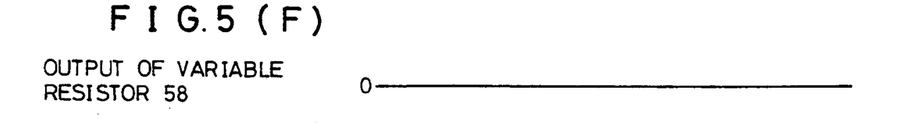

Next, a case where the rotational angular velocity is applied to the angular velocity sensor 12 from the outside is considered. In this case, since the known rotational angular velocity is applied to the angular velocity sensor 12, by the rotational angular velocity from the outside, for example, a voltage generated in the piezoelectric element 16a becomes larger and a voltage generated in the piezoelectric element 16b becomes smaller. Therefore, an amplitude of the output signal of the first differential circuit 44 become larger as compared with the case where only the known rotational angular velocity is applied, as shown in FIG. 5(A). This signal is detected in synchronism with the phases which differ from each other by 180°, in the first synchronous detection circuit 46 and the second synchronous detection circuit 48. Thus, the output signal of the first synchronous detection circuit 46 becomes a positive side signal centering around 0 V, as shown in FIG. 5(B). The output signal of the second synchronous detection circuit 48 becomes a negative side signal centering around 0 V, as shown in FIG. 5(C). When these signals are smoothed in the first smoothing circuit 50 and the second smoothing circuit 54, and further, amplified in the first amplifying circuit 52 and the second amplifying circuit 56, as shown in FIG. 5(D) and FIG. 5(E), the signals which are in opposite direction with each other and having the same strength are output. When these signals are composed in the variable resistor 58, the output of the variable resistor 58 becomes zero. Thereby, it is clear that the linear velocity or acceleration is not applied to the angular velocity sensor 12.

Figure 5G:
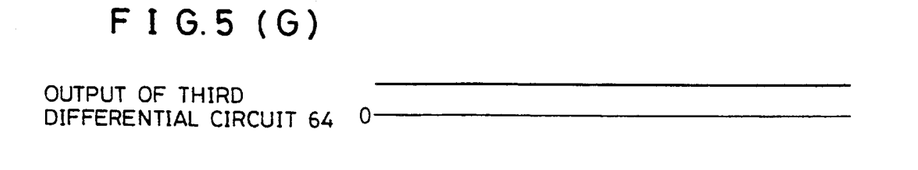

In the second differential circuit 60, though the output signal of the variable resistor 58 is subtracted from the output signal of the first amplifying circuit 52, since the output of the variable resistor 58 is zero, the output signal of the first amplifying circuit 52 is outputted from the second differential circuit 60 as it is. In this output signal, signals corresponding to the known rotational angular velocity applied to the angular velocity sensor 12 and the rotational angular velocity applied from the outside are included. Thus, when the signal corresponding to the known rotational angular velocity is subtracted in the third differential circuit 64, as shown in FIG. 5(G), only the signal corresponding to the rotational angular velocity applied from the outside is outputted. From this signal, the rotational angular velocity applied to the angular velocity sensor 12 from the outside can be known.

Figure 6A:
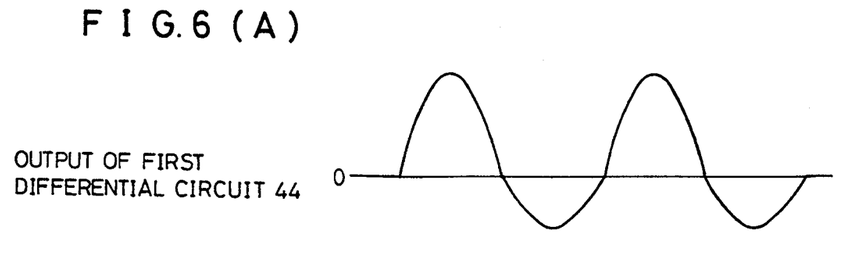
FIGS. 6(A)–6(G) are graphs showing output signals of respective circuits, when a known rotational angular velocity, a linear velocity or acceleration and an external rotational angular velocity are applied to an angular velocity sensor.
Figure 6B:
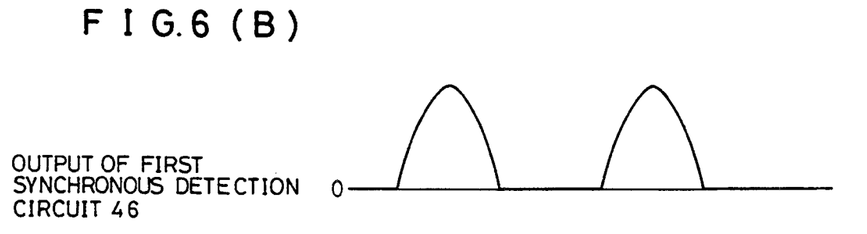
Figure 6C:
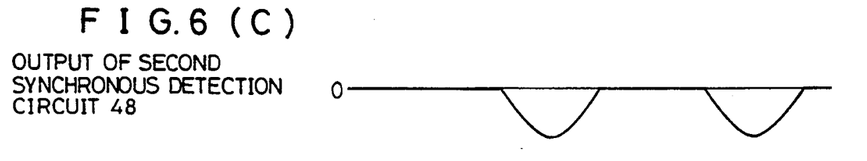
Figure 6D:
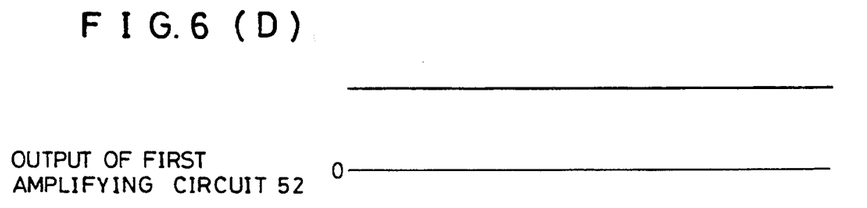
Figure 6E:
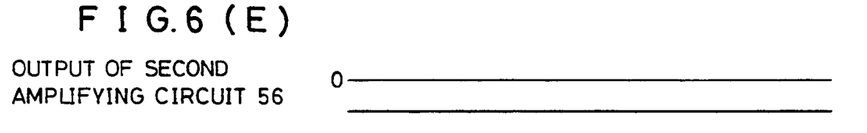
Figure 6F:
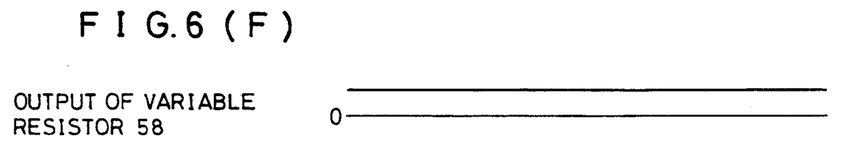

Next, a case where both the external rotational angular velocity and the linear velocity or acceleration are applied to the angular velocity sensor 12 from the outside is considered. In this case, from the first differential circuit 44, as shown in FIG. 6(A), an output signal which has a larger amplitude than the case where, for example, only the known rotational angular velocity is applied, and is shifted to the positive side from 0 V is obtained. This signal is detected in synchronism with the phases which differ from each other by 180°, in the first synchronous detection circuit 46 and the second synchronous detection circuit 48. Thus, from the first synchronous detection circuit 46, as shown in FIG. 6(B), a positive side voltage is output. From the second synchronous detection circuit 48, as shown in FIG. 6(C), a negative side voltage is output. These signals are smoothed in the first smoothing circuit 50 and the second smoothing circuit 54, and further, amplified in the first amplifying circuit 52 and second amplifying circuit 56. Thus, from the first amplifying circuit 52, as shown in FIG. 6(D), a high voltage is output, and from the second amplifying circuit 56, as shown in FIG. 6(E), a low voltage is output. By composing these signals in the variable resistor 58, the signals corresponding to the known rotational angular velocity and the rotational angular velocity applied from the outside are canceled. From the variable resistor 58, only the output signal corresponding to the linear velocity or acceleration is output as shown in FIG. 6(F).

Figure 6G:
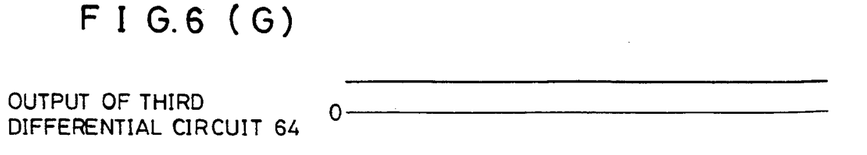

In the second differential circuit 60, the output signal of the variable resistor 58 is subtracted from the output signal of the first amplifying circuit 52. Therefore, the output of the second differential circuit 60 becomes the signal corresponding to the known rotational angular velocity applied to the angular velocity sensor 12 and the rotational angular velocity applied from the outside. Thus, when the signal corresponding to the known rotational angular velocity is subtracted in the third differential circuit 64, only the signal corresponding to the rotational angular velocity applied from the outside is output as shown in FIG. 6(G). From this signal, the rotational angular velocity applied from the outside can be known.

In the above-mentioned embodiment, the amplitude of the output signal of the first differential circuit 44 becomes larger by the external rotational angular velocity, and the output signal of the first differential circuit 44 shifts to the positive side by the linear velocity or acceleration. However, depending on the direction and magnitude of the external rotational angular velocity and the linear velocity or acceleration applied, the output signal of the first differential circuit 44 becomes smaller or is shifted to the negative side. Even in such cases, in the same manner as the above-mentioned embodiment, the rotational angular velocity and the linear velocity or acceleration can be detected.

As such, by using the gyro-compass 10, both the rotational angular velocity and the linear velocity or acceleration can be measured. Thus, by integrating the linear velocity or acceleration, a moving distance can be known. Furthermore, since a moving direction can be known from the rotational angular velocity, even when the automobile and the like is moved, its position can be detected accurately. In this case, since the moving distance and direction can be measured accurately, errors due to the amount of air in the tires and unevenness of a road can be eliminated. Besides, connections at a time of installing on the automobile can be simplified.

As arrangements Of the gyro-compass 10, it may be arranged such that, an axis of the vibrator 14 is in a horizontal direction or in a vertical direction. It may also be arranged such that, the axis of the vibrator 14 is in a direction other than the horizontal and vertical directions. That is, in the gyro-compass 10, the rotational angular velocity about the axis of the vibrator 14, and the linear velocity or acceleration orthogonal to the axis can be measured. Thus, by using a plurality of gyro-compasses 10 and changing the directions of arrangement, the rotational angular velocity and the linear velocity or acceleration in all directions can be measured.

In the above-mentioned embodiment, though the angular velocity sensor 12 is bent and vibrated by self-oscillation driving, it is also possible to be bent and vibrated by separate-oscillation driving. Furthermore, as the angular velocity sensor, it is not limited to a vibration type, it is also possible to use other angular velocity sensors such as an optical fiber type, a gas rate type and a rotational-gyroscope. By applying the known rotational angular velocity to these angular velocity sensors, both the rotational angular velocity from the outside and the linear velocity or acceleration can be detected. Though the piezoelectric element was used as means for applying the known rotational angular velocity, the other electromagnet and actuator may also be used.

While the present invention has been particularly described and shown, it is to be understood that such description is used merely as an illustration and example rather than limitation, and the spirit and scope of the present inventions determined solely by the terms of the appended claims.

What is claimed is:

1. A gyro-compass comprising:
   an angular velocity sensor;
   angular velocity applying means for applying a known rotational angular velocity to said angular velocity sensor;
   a plurality of synchronous detection circuits for detecting an output signal of said angular velocity sensor in synchronism with different phases;
   a plurality of smoothing circuits for smoothing output signals of said plurality of synchronous detection circuits;
   a composite circuit for composing output signals of said plurality of smoothing circuits;
   a differential circuit for obtaining a difference between one output signal of said plurality of smoothing circuits and an output signal of said composite circuit; and
   a separate differential circuit for obtaining a difference between an output of said differential circuit and a signal corresponding to the known rotational angular velocity applied by said angular velocity applying means.

2. A gyro-compass in accordance with claim 1, wherein by detecting the output signal of said angular velocity sensor at the phase difference of 180° respectively in said plurality of synchronous detection circuits, a positive portion and a negative portion of the output signal of said angular velocity sensor are detected.

3. A gyro-compass in accordance with claim 1, wherein said composite circuit is a variable resistor.

4. A gyro-compass in accordance with claim 1, wherein said angular velocity applying means includes piezoelectric elements for generating vibration within a circle about said angular velocity sensor, and an oscillation circuit for driving said piezoelectric elements, and a signal corresponding to a known rotational angular velocity is obtained by smoothing an output signal of said oscillation circuit.

5. A gyro-compass in accordance with claim 1, wherein said angular velocity sensor is a vibrating gyroscope utilizing bending and vibrating movement of a columnar vibrator.

6. A gyro-compass in accordance with claim 5, wherein said vibrating gyroscope includes said vibrator of triangular columnar shape and piezoelectric elements formed on the side faces of said vibrator.

7. A gyro-compass in accordance with claim 4, wherein a difference of output signals obtained from two piezoelectric elements among said piezoelectric elements formed on said vibrating gyroscope is input to said synchronous detection circuits.

8. A gyro-compass in accordance with claim 5, wherein said vibrating gyroscope is bent and vibrated by a driving circuit consisting of an oscillation circuit and a phase circuit, and a signal for synchronous detection is applied to said synchronous detection circuit from said phase circuit.

* * * * *